J. A. LAMONT.
AUXILIARY SPRING FOR CAR TRUCKS.
APPLICATION FILED SEPT. 11, 1916.

1,210,493.

Patented Jan. 2, 1917.
2 SHEETS—SHEET 1.

J. A. LAMONT.
AUXILIARY SPRING FOR CAR TRUCKS.
APPLICATION FILED SEPT. 11, 1916.

1,210,493.

Patented Jan. 2, 1917.

UNITED STATES PATENT OFFICE.

JOHN A. LAMONT, OF CHICAGO, ILLINOIS, ASSIGNOR TO AMERICAN STEEL FOUNDRIES, OF NEW YORK, N. Y., A CORPORATION OF NEW JERSEY.

AUXILIARY SPRING FOR CAR-TRUCKS.

1,210,493.   Specification of Letters Patent.   Patented Jan. 2, 1917.

Application filed September 11, 1916. Serial No. 119,465.

*To all whom it may concern:*

Be it known that I, JOHN A. LAMONT, a citizen of the United States, and resident of Chicago, in the county of Cook and State of Illinois, have invented certain new and useful Improvements in Auxiliary Springs for Car-Trucks, of which the following is a specification.

My invention relates to railway car trucks and has particular reference to a novel auxiliary shock absorbing element.

Difficulty has been experienced in providing shock absorbing elements adapted to be disposed between the bolster and side frame of a truck which shall at the same time be of sufficient capacity to absorb all shocks and sufficiently resilient and susceptible as to absorb light shocks such as occur due to the unevenness of the roadbed, etc. The practice has been to provide springs which have a theoretical capacity as great as will be required. It has been found, however, that the passage of freight cars over even the best constructed track sets up a synchronous vibration or teetering which continues until the springs are set solid. Resulting hammering breaks the truck parts and damages the rails and track.

I propose to obviate the objections referred to by providing an auxiliary shock absorbing element, locating the same at a point beneath the spring seat and transmitting thereto by a multiplied motion any excessive shocks. This puts an end to teetering and enables the employment of much lighter springs than has heretofore been thought possible. This not only reduces the cost but insures a more resilient operation under normal conditions.

Figure 1:
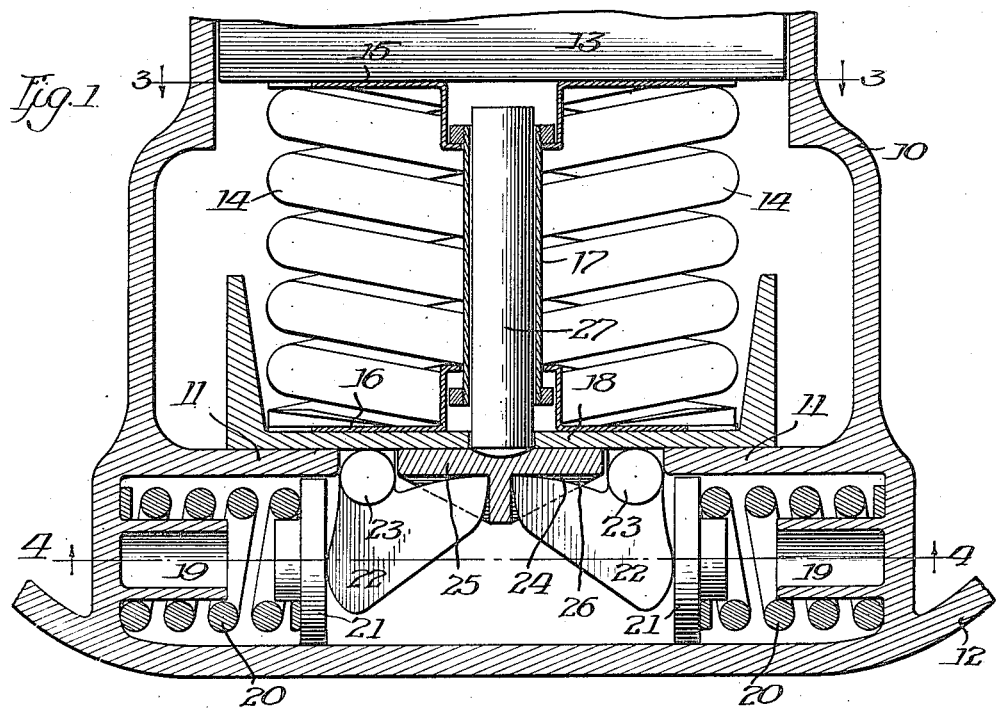
Figure 2:
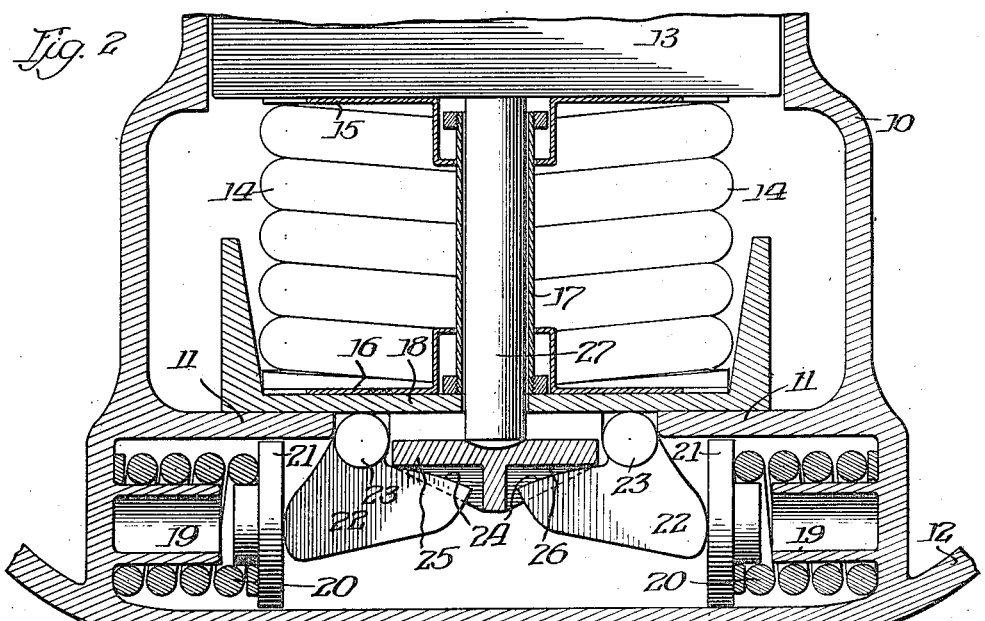
Figure 3:
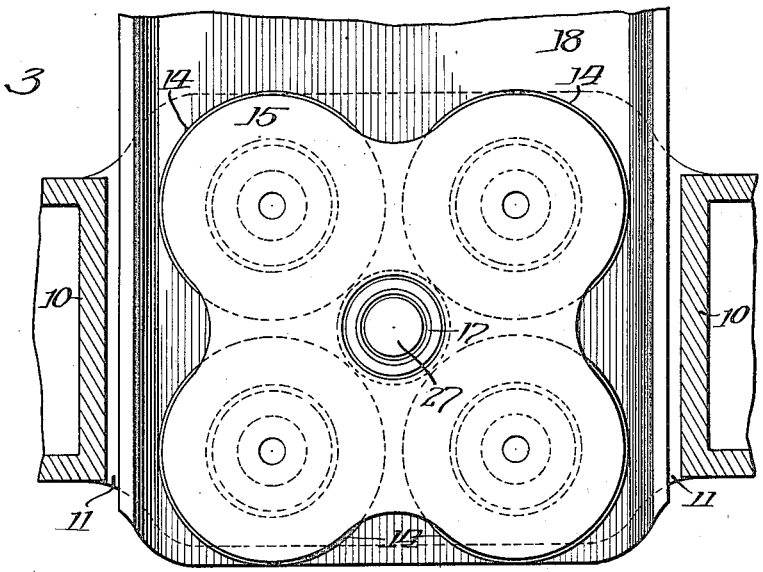
Figure 4:
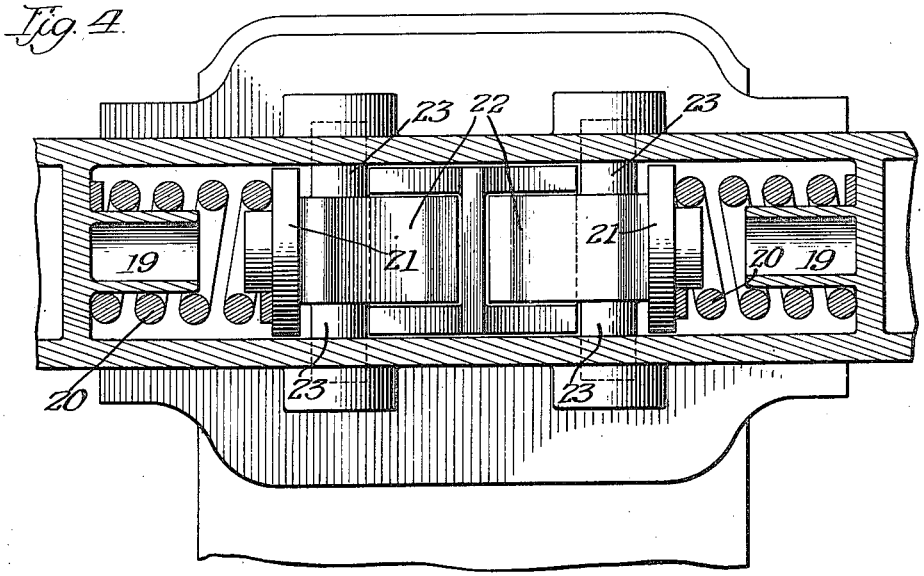

The invention will be more readily understood by reference to the accompanying drawings, wherein, Figure 1 is a fragmentary vertical section through a car truck constructed in accordance with my invention; Fig. 2 is a similar view showing the parts in fully compressed condition; Fig. 3 is a plan view on the line 3—3 of Fig. 1, and Fig. 4 is a sectional plan view on the line 4—4 of Fig. 1.

Referring more particularly to the drawings it will be seen that I have shown a cast side frame including columns 10, spring seat 11 and tension member 12. A bolster 13, is reciprocably mounted in the bolster opening in the frame and rests upon a nest of coil springs 14, confined between upper and lower spring caps 15, 16 which caps are united at their axial central portions by means of the cylinder or sleeve 17. The nest of springs rests upon a spring plank 18, which serves to connect the two side frames forming the truck. The space between the spring seat 11, and the tension member 12, is utilized to accommodate the auxiliary springs of my invention. Preferably I provide centering lugs 19, at each end of the recess, these lugs being horizontally disposed and serving to support coil springs 20. A cap 21, engages the springs, the caps being engaged by bell cranks 22. These bell cranks serve to transmit vertical into horizontal motion and include trunnions 23, which are seated in suitable bearings in the spring seat and are retained in proper position by the spring plank 18. One arm of each of the bell cranks engages the spring cap 21, the other arm, which is curved as indicated at 24, engaging a follower plate 25, the lower surface 26, of which is flat at the point where it engages the curved surface of the bell crank. The arrangement is such that as the follower descends the point of engagement with the bell crank is changed, the motion transmitted to the spring 20, being increased as will be readily understood by reference to Fig. 2. Motion is transmitted to the follower 25 by the plunger 27, located within the cylinder 17, the upper end of which is as seen in Fig. 1, normally a short distance below the bolster 13. Under ordinary shocks the auxiliary mechanism is not employed but under an extreme shock the parts are actuated to transmit force to the auxiliary springs. By the change in leverage or the multiplication of motion a relatively high resistance is offered under an extreme shock before the springs are set solid.

The exact form and arrangement of the parts is entirely immaterial and many modifications will suggest themselves to those skilled in the art. Such modifications I consider within the scope of my invention.

I claim:

1. In a car truck, the combination of a side frame, a bolster coöperating therewith, springs upon which said bolster directly bears, auxiliary springs, and motion multiplying means positively actuated by said bolster for transmitting force to said auxiliary springs, substantially as described.

2. In a car truck, the combination of a side frame, a bolster coöperating therewith, a shock-absorbing element between the bolster and frame, a second shock-absorbing element angularly disposed with relation to said first shock-absorbing element, and means separate from and actuated by said bolster for changing the direction of and transmitting force to said second shock-absorbing element.

3. In a car truck, the combination of a side frame, a bolster, vertical springs between said bolster and frame, horizontally-disposed auxiliary springs, and means actuated by said bolster for changing the vertically-directed force exerted by said bolster into a horizontally-directed force and applying said force to said auxiliary spring, substantially as described.

4. In a car truck, the combination of a frame, a bolster, shock-absorbing means between said bolster and frame, supplementary shock-absorbing means and means including a lever for multiplying the motion of said bolster relative to the compression of said supplementary shock-absorbing means.

5. In a car truck, the combination of a frame, a bolster, shock-absorbing means between said bolster and frame, supplementary shock-absorbing means, means for transmitting force from said bolster to the supplementary shock absorbing means and means for varying the compression of said supplementary shock-absorbing means relative to the travel of the bolster.

6. In a car truck, the combination of a side frame, a bolster mounted for vertical reciprocation in said frame, a spring interposed between said frame and bolster, an auxiliary spring disposed at an angle to said first mentioned spring, and means for changing the direction of the force applied by the bolster to a direction corresponding to the line of greatest resistance of said auxiliary spring and applying said force to said last-named spring, substantially as described.

7. In a car truck, the combination of a side frame, a bolster mounted for vertical reciprocation in said frame, a spring interposed between said frame and bolster, an auxiliary shock-absorbing element disposed at an angle to said spring, and means for changing the direction of force applied by said bolster and applying the same to said shock-absorbing element with a varying resistance relative to the travel of the bolster, substantially as described.

8. A side frame having a seat for the accommodation of a nest of vertically disposed springs and providing a space beneath said seat for the accommodation of a plurality of horizontally disposed auxiliary springs, substantially as described.

9. In a car truck, the combination of a side frame, a spring seat on said frame, a bolster reciprocably mounted in the frame, a spring resting upon said seat and serving to support said bolster, an auxiliary spring horizontally disposed beneath said seat, and means positively actuated by said bolster for transmitting force to said auxiliary spring, substantially as described.

10. In a car truck, the combination of a side frame, a spring seat on said frame, a bolster reciprocably mounted in the frame, a spring resting upon said seat and serving to support said bolster, an auxiliary spring horizontally disposed beneath said seat, and a bell crank acting to transmit force from said bolster to said auxiliary spring and to change the direction of application of such force from vertical to horizontal, substantially as described.

11. In a car truck, the combination of a side frame, a spring seat on said frame, a bolster reciprocably mounted in the frame, a spring resting upon said seat and serving to support said bolster, an auxiliary spring mounted in said frame, and a lever mounted to transmit force from said bolster to said auxiliary spring the fulcrum of said lever being located to multiply the motion of said bolster, substantially as described.

12. In a car truck, the combination of side frame and bolster said frame having a tension member and a spring seat, a space being provided therebetween, a horizontally disposed coil spring in said space, a bell crank acting upon said spring, a vertically disposed spring upon said seat, and a plunger adapted to be acted upon by said bolster, one end of which plunger engages said bell crank, whereby force is transmitted to said horizontally disposed spring, substantially as described.

Signed at Chicago, Illinois, this 5 day of September, 1916.

JOHN A. LAMONT.

Witnesses:
GEO. G. FLOYD,
E. W. PALMQUIST.